United States Patent [19]

Becher et al.

[11] 3,920,825

[45] Nov. 18, 1975

[54] PROCESSES FOR PRODUCING CONCENTRATED AQUEOUS SOLUTIONS OF FLUOBORIC ACID

[75] Inventors: Wilfried Becher, Ilten; Joachim Massonne, Hannover, both of Germany

[73] Assignee: Kali-Chemie Aktiengesellschaft, Hannover, Germany

[22] Filed: Aug. 7, 1973

[21] Appl. No.: 386,471

[30] Foreign Application Priority Data

Aug. 8, 1972 Germany............................ 2239131

[52] U.S. Cl. ................. 423/276; 423/240; 423/277
[51] Int. Cl.$^2$.......................................... C01B 35/06
[58] Field of Search..................... 423/276, 277, 240

[56] References Cited
UNITED STATES PATENTS

| | | | |
|---|---|---|---|
| 1,938,533 | 12/1933 | Penfield.............................. | 423/341 |
| 3,353,911 | 11/1967 | Moller et al. .................... | 423/240 X |

FOREIGN PATENTS OR APPLICATIONS

| | | | |
|---|---|---|---|
| 985,769 | 3/1965 | United Kingdom................. | 423/276 |
| 226,490 | 10/1925 | United Kingdom................. | 423/276 |

OTHER PUBLICATIONS

Lauer et al., "Chemical Engineering Techniques," 1952, pages. 418–419.

Ryas; I. G., The Chemistry of Fluorine & its Inorg. Compounds; State Pub. House; Moscow, 1956.

*Primary Examiner*—G. O. Peters
*Attorney, Agent, or Firm*—Michael S. Striker

[57] ABSTRACT

Hydrogen fluoride is readily absorbed in concentrated aqueous solutions of fluoboric acid containing hydroxyfluoboric acid that is formed by adding boric acid to such solutions. The hydrogen fluoride that is absorbed reacts with the hydroxyfluoroboric acid to produce additional quantities of the concentrated fluoboric acid. This process can be used to absorb hydrogen fluoride that is present in gases containing hydrogen chloride and hydrogen fluoride, such as the gases that are produced in the production of fluorochloroalkanes, from which hydrogen fluoride is selectively absorbed. In a continuous process for the production of concentrated fluoboric acid, additonal amounts of boric acid are continuously added to a circulating concentrated solution of fluoboric acid through which a gas containing hydrogen fluoride is passed while additonal quantities of the concentrated solution of fluoboric acid that is thus formed by reaction of hydrogen fluoride with the boric acid are continuously withdrawn.

8 Claims, 1 Drawing Figure

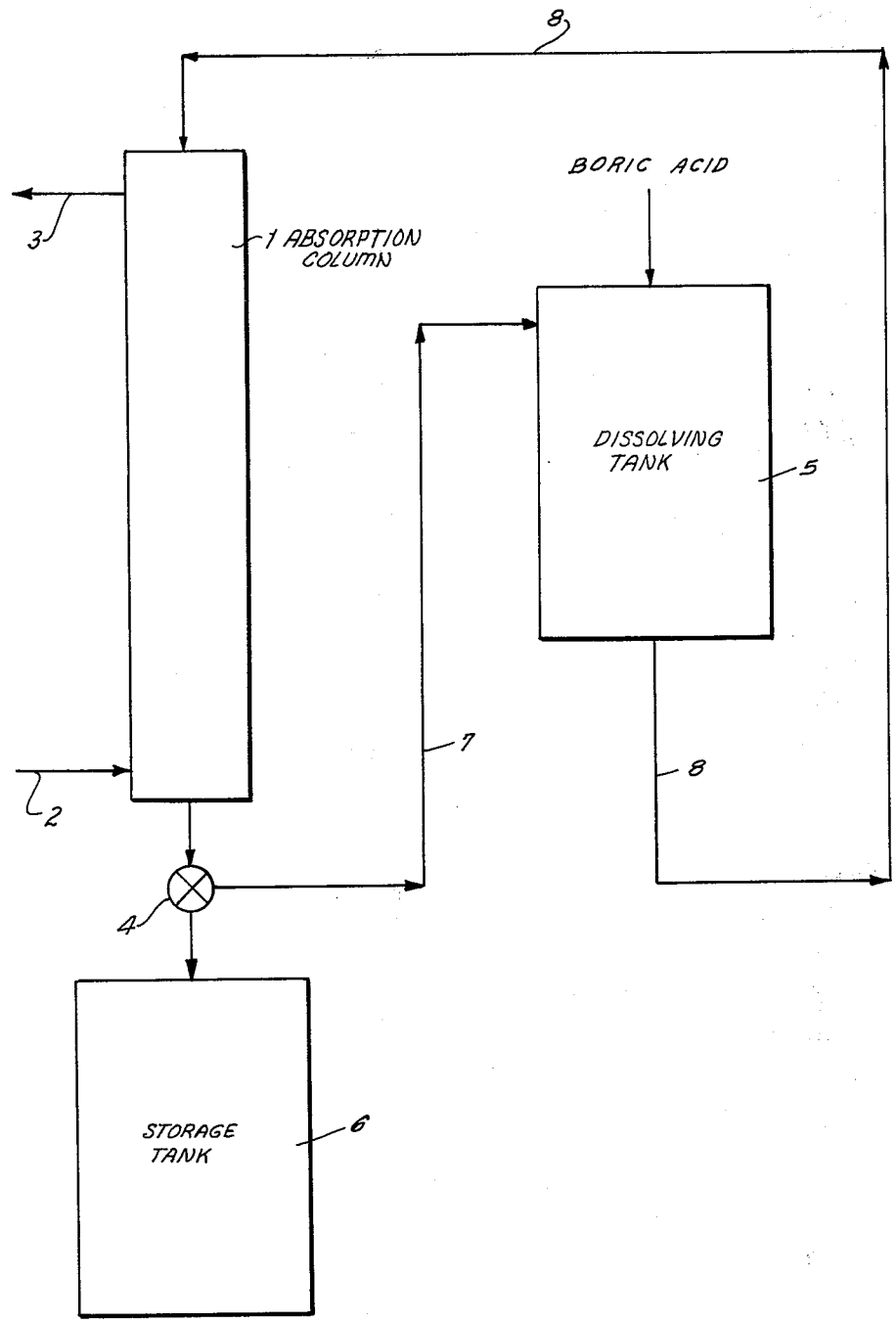

PROCESSES FOR PRODUCING CONCENTRATED AQUEOUS SOLUTIONS OF FLUOBORIC ACID

BACKGROUND OF THE INVENTION

Fluoboric acid is generally produced by the reaction of boric acid with hydrofluroic acid in accordance with the equation:

$$H_3BO_3 + 4HF \rightarrow HBF_4 + 3H_2O \qquad 1$$

In this process boric acid is generally added to a concentrated solution of hydrofluoric acid while the mixture is cooled. When a solution containing 70% by weight of hydrofluoric acid is used, the resulting solution contains 50% by weight of fluoboric acid.

To produce more concentrated solutions of fluoboric acid it is necessary to use expensive starting reagents such as, for example, boron trioxide, metaboric acid or anhydrous hydrogen fluoride. The difficulties encountered in carrying out the reaction are considerably increased because of the high enthalpy or heat content of the reaction. No procedure has heretofore been known for using gases containing hydrogen fluoride to produce concentrated solutions of fluoboric acid.

A process is disclosed in U.S. Pat. No. 3,016,285 for selectively absorbing hydrogen fluoride from hot waste gases from the digestion of crude phosphates by use of aqueous solutions containing 3% by weight of boric acid. These solutions are adapted to abosrb all of the hydrogen fluoride. However, their acidity or hydrogen-ion concentration is so low that at the same time a considerable portion of the sulfur dioxide which is also present in the waste gases is absorbed also. This disadvantage can be avoided if one adds to the dilute solutions of boric acid a small quantity of fluoboric acid. Since fluoboric acid is also formed by absorption of hydrogen fluoride by the boric acid in such solutions, new quantities of the absorbing solution can be produced by diluting of a part of said solution, saturated with hydrogen fluoride, with fresh aqueous boric acid solution.

The greatest efficiency with respect to obtaining a practically complete absorption of hydrogen fluoride in accordance with the foregoing process depends upon the use of very dilute solutions of boric acid. This indicates that water predominantly serves as the absorbing agent for the hydrogen fluoride and that the boron compounds contained therein serve the purpose of maintaining the high absorbability of water for hydrogen fluoride and at the same time assure the requisite acidity for preventing the absorption of sulfur dioxide.

Another process is disclosed in United Kingdom Pat. No. 985,769 in accordance with which the efficiency of concentrated hydrochloric acid as an absorbent of hydrogen fluoride that is present in gases formed in the production of fluorochlorohydrocarbons which consist of halogenated hydrocarbons and hydrogen chloride together with smaller proportions of hydrogen fluoride, can be improved when between 5 and 10 % by weight of hydrogen fluoride and a similar quantity of boric acid are added thereto so that the atomic ratio of fluorine to boron is between 2:1 and 4:1. In this hydrochloric acid washing solution the fluoboric acid is formed only as a secondary material and in a smaller concentration. A commercial produce cannot be prepared from this solution because of its high content of water and hydrogen chloride.

The addition of a potassium salt to such a solution of hydrochloric acid containing fluoboric acid and recovery of the fluoboric acid as its potassium salt was disclosed in French Pat. No. 1,427,940. However, in this process only an impure product contaminated with potassium hydroxyfluoborate is obtainable. The purpose of compounds such as boric acid and potassium chloride added to the hydrochloric acid solution is to keep the vapor pressure of hydrogen fluoride over this solution at a permanent low level. By this means its capacity for scrubbing hydrogen fluoride out of gas mixtures, for which concentrated hydrochloric acid is known to be very suitable, is maintained.

SUMMARY OF THE INVENTION

In the process of the present invention, in which concentrated fluoboric acid is produced by reaction of boric acid and hydrogen fluoride, solid boric acid is dissolved in a concentrated solution of fluoboric acid and a stream of a gas containing hydrogen fluoride is passed countercurrently through the resulting solution in a suitable apparatus. The resulting quantity of concentrated fluoboric acid solution which has been produced by absorption of a stoichiometric quantity of hydrogen fluoride to convert the boric acid added thereto into fluoboric acid is then separated and the remaining quantity of the solution is reused for the production of further quantities of concentrated fluoboric acid. This is accomplished by the addition of fresh quantities of boric acid thereto and further absorption of hydrogen fluoride. The process can be performed in both continuous and discontinuous modes or manners, in accordance with the following equations:

$$3HBF_4 + H_3BO_3 + H_2O \rightarrow 4\ HBF_3OH \qquad 2$$
$$4HBF_3OH + 4HF \rightarrow 4\ HBF_4 + 4\ H_2O \qquad 3$$

A 62 % solution of fluoboric acid is for example capable of dissolving so much boric acid that even at room temperature the solution and formation of hydroxyfluoric acid proceeds in accordance with the foregoing Equation 2. By reaction with hydrogen fluoride in gases containing hydrogen fluoride the hydroxyfluoboric acid is converted to fluoboric acid in accordance with Equation 3. The result of these two reactions is the sum of Equations 2 and 3 which is represented in Equation 1 hereinbefore, and in accordance with which 1 mol of boric acid and 4 mols of hydrogen fluoride yield 1 mol of fluoboric acid and 3 mols of water; this molecular ratio of fluoboric acid to water corresponds to that of a 62 % by weight solution of fluoboric acid.

DETAILED DESCRIPTION

In practice, for the production of concentrated fluoboric acid in accordance with the processes of the present invention, a 62% solution of fluoboric acid is preferably used, especially when the process is to be performed in a continuous manner. In this manner, one can continuously withdraw the 62% solution of fluoboric acid that is newly formed from the boric acid that is added to the starting 62% solution of fluoboric acid. It is, however, also possible to start with a less-concentrated solution of fluoboric acid, for by the corresponding frequent repetition of the addition to the solution of boric acid on one hand and the absorption of anhydrous hydrogen fluoride on the other, as well as the subsequent withdrawal of a portion of the resulting product, a solution having a concentration of 62 % by weight of fluoboric acid can be obtained. Generally a solution of fluoboric acid having a concentration lower than 50 % by weight would not be used because of the lower solubility of boric acid in such a solution and the lower capacity of the solution for absorbing hydrogen fluoride.

The boric acid that is required in the process can also be added in the form of metaboric acid or boron trioxide, which compounds contain proportionately 1 and 1½ fewer molecules of water than boric acid, which is also known as orthoboric acid, if solutions having concentrations higher than 62 % by weight of fluoboric acid are desired. Since fluoboric acid solutions showing concentrations in excess of 62 % will exhibit increasing hydrogen fluoride vapor pressures, such concentrated solutions are less suitable for the absorption of hydrogen fluoride from gaseous mixtures containing the same. These forms of boric acid which contain a smaller proportion of bound water in their structures are advantageously used when, for example, only fluoboric acid is available having a lower concentration than 62 % and it is desired to bring up the acid to a higher concentration that is preferred for carrying out the process in a continuous manner.

An advantage of the processes of the present invention is that the heat that is released in the reaction of boric acid and hydrogen fluoride is more readily controlled in the process of the present invention than was possible in the processes for the production of concentrated fluoboric acid by previously known methods. Advantageously the reaction is carried out at a temperature below 50°C.

The concentration of the hydrogen fluoride in the gases that are used in the processes of the present invention is not critical. Gases such as are obtained as waste or by-products of many processes which contain hydrogen fluoride can be used. For example, gases containing hydrogen fluoride can be used which contain such small proportions of hydrogen fluoride that they could not be used heretofore for the production of useful products or from which it was heretofore too difficult to recover the hydrogen fluoride.

Although the reaction of hydroxyfluoboric acid, which is formed in accordance with Equation 2, with hydrogen fluoride to form fluoboric acid, is comparatively slow, the hydroxyfluoboric acid unexpectedly was found to possess an excellent capacity for absorbing hydrogen fluoride. On the other hand, it exhibits very little capacity for abosrbing many other gases such as, for example, air, sulfur dioxide, carbon dioxide, haloalkanes, and even hydrogen chloride, hydrogen bromide and hydrogen iodide. Gases which do not contain high concentrations of hydrogen fluoride are advantageous because cooling means for dissipating the heat that is evolved during the reaction between boric acid and hydrogen fluoride thus not required.

The apparatus that is required for carrying out the production of concentrated fluoboric acid in accordance with the processes of the present invention, which is represented in the accompanying drawing that is a flow-sheet of a preferred embodiment thereof can be constructed of synthetic resinous materials such as rigid polyethylene, polypropylene or poly(vinyl chloride) plastics that are resistant to the reactants and products involved in the process.

A rapid and almost complete absorption of hydrogen fluoride can also be obtained when the gas contains only small proportions of hydrogen fluoride. With suitable absorption columns such as packed columns, bubble-tray columns or other similar efficient apparatus, it is possible to obtain an adequate contact between the hydroxyfluoboric acid and the gas.

In carrying out the processes of the present invention in a continuous manner, the absorption column 1, which is provided with a gas inlet tube 2 and a gas outlet tube 3, is connected via the adjustable valve 4 to a dissolving tank 5 and to a storage tank 6. The circulating portion of the fluoboric acid, which is returned from the bottom of the absorption column 1 through line 7 into the dissolving tank 5, is reconverted into hydroxyfluoboric acid by addition of boric acid thereto and said hydroxyfluoboric acid is introduced through line 8 into the top of the absorption column 1. By simultaneously withdrawing portions of fluoboric acid that are formed in the absorption column 1, which correspond to the amounts of hydrogen fluoride that had been absorbed, from the column 1 into the storage tank 6, it is possible to maintain a preselected constant quantity of the liquid in the apparatus.

Especially suitable for the production of fluoboric acid in accordance with the processes of the present invention are the waste gaseous mixtures that are formed in the production of fluorochloro hydrocarbons such as difluorodichloromethane which contain besides the halogenated hydrocarbons large proportions of hydrogen chloride and several percent of hydrogen fluoride. From such gas mixtures the hydrogen fluoride is selectively absorbed and the hydrogen chloride and fluorochlorohydrocarbons in the gas leaving the absorber can be separated from each other in known manner. In this manner the hydroxyfluoboric acid used in as high as possible concentrations serves two purposes when used in accordance with the processes of the present invention, namely, one is to assure the rapid selective absorption of hydrogen fluoride and the other is to produce a concentrated solution of fluoboric acid which contains at most a small proportion of hydrogen chloride dissolved therein. Thus, for example, a 62% solution of fluoboric acid at room temperature and atmospheric pressure absorbs only between 0.5 and 0.7% by weight of hydrogen chloride. The hydrogen chloride content of the fluoboric acid thus produced can be reduced by further purification in which an inert gas such as air or nitrogen is passed therethrough. In this manner all but traces of hydrogen chloride can be removed. The process of the present invention can also be carried out optionally with other gas mixtures containing hydrogen fluoride provided that the accompanying gases do not dissolve in or react with the participating boron compounds.

The processes of the present invention are described and illustrated further in connection with the examples which follow.

EXAMPLE 1

In this example an apparatus was used that is represented in the accompanying flow-sheet which was constructed of a rigid polyethylene plastic material and was adapted for carrying out the process in a continuous manner. This apparatus consisted of a bubble-tray absorption column 1 through which a liquid could be passed downwardly while a stream of gas that was to be absorbed was passed upwardly, countercurrently to the flow of the liquid. This absorption column was connected by means of conduits to a dissolving tank 5 into which a solid could be supplied and from which the liquid could be passed to and circulated therefrom through the abosrption column and returned to the dissolving tank. The column was also provided with an adjustable outlet valve 4 at its bottom for withdrawal of liquid therefrom.

To a polyethylene tank containing 5 kilograms of an aqueous solution of fluoboric acid having a concentration of 55% of fluoboric acid by weight was added with stirring 1.39 kilograms of metaboric acid ($HBO_2$) and after the metaboric acid was dissolved therein, 2.54 kilograms of anhydrous pure hydrogen fluoride was passed into the solution at a rate of 200 grams per hour while the external surface of the tank was cooled. In this manner, 8.95 kilograms of a concentrated aqueous solution of fluoboric acid having a concentration of 62% by weight of fluoboric acid was produced.

The foregoing concentrated solution of fluoboric acid was then pumped into the dissolving tank of the foregoing apparatus and mixed therein with such an amount of boric acid that the resulting solution contained about 70% by weight of hydroxyfluoboric acid having the formula $HBF_3OH$. This solution was then withdrawn from the dissolving tank at a flow rate of 5.1 kilograms per hour and passed into the head of the absorption column 1 through which it was circulated downwardly. A stream of gas containing approximately 40% by volume of fluorochlorohydrocarbons, 58% by volume of hydrogen chloride and 2% by volume of hydrogen fluoride, which was recovered in a process for the production of such fluorochlorohydrocarbons, was passed upwardly through the column at a rate such that 0.8 kilogram per hour of hydrogen fluoride was introduced into the column while at the same time 5.9 kilograms per hour of the concentrated fluoboric acid were withdrawn from the bottom of the absorption column. A smaller amount of the acid was withdrawn through the adjustable outlet valve 4 at a rate of 1.4 kilograms per hour and collected into a storage tank 6 while the main quantity was returned into the dissolving tank at a rate of 4.5 kilograms per hour. The absorption column was maintained at a temperature of 26°C.

The fluoboric acid produced in this manner had the following composition by weight:

$HBF_4$ - 61.6 %

$H_3BO_3$ - 1.82 %

HCl - 0.5 %

$H_2O$ - 36.0 %

By passing a stream of nitrogen through the thus-prepared concentrated fluoboric acid solution its content of hydrogen chloride was reduced to 0.002 % by weight.

The content of hydrogen fluoride in the gas stream, which was originally 2 % by volume, is reduced to 0.003 % by volume after passing through the absorption column containing the concentrated fluoboric acid.

This example illustrates that the process described therein is especially adapted for use in the recovery of hydrogen fluoride as concentrated fluoboric acid from gases containing the same which contain no other components that might interfere with the production of fluoboric acid.

EXAMPLE 2

In this example an apparatus was used that was constructed of rigid poly(vinyl chloride) plastic material. It included a gas scrubber formed of a column packed with Raschig rings made of a rigid polyethylene plastic material and a supply conduit connecting the head and bottom of the gas scrubber so that liquids could be continuously circulated through the gas scrubber. Into this apparatus was introduced 5.0 kilograms of an aqueous solution containing 70.5% by weight of hydroxyfluoboric acid which had been prepared by dissolving boric acid in an aqueous solution containing 62% by weight of fluoboric acid. While the hydroxyfluoboric acid was circulated through the gas scrubber, hydrogen fluoride that was contaminated with hydrogen chloride and inert gases was injected thereinto at such a rate that 110 grams of hydrogen fluoride per hour was supplied to the circulating liquid. After about 7½ hours the rate of absorption of hydrogen fluoride in the solution had decreased considerably. Thereupon 0.85 kilogram of boric acid was added to the liquid in the apparatus. After a further period of 10 hours, during which the gas containing hydrogen fluoride was introduced into the apparatus, 7.77 kilograms of a 62% solution of fluoboric acid was withdrawn therefrom, which contained only 0.5% by weight of hydrogen chloride. After passing air through the concentrated solution of fluoboric acid for 2 hours, its content of hydrogen chloride was reduced to 5 parts per million.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A process for the production of a concentrated aqueous solution of fluoboric acid that is essentially free of hydrogen chloride which comprises dissolving a boron compound of the group consisting of orthoboric acid, metaboric acid and boron trioxide in an aqueous solution of fluoboric acid containing at least 50% by weight of fluoboric acid and passing through the said solution a gas containing hydrogen fluoride and hydrogen chloride at such a rate that the hydrogen fluoride in the gas is selectively absorbed and reacts with the dissolved boron compound therein to form an additional quantity of fluoboric acid and thereby produce a more concentrated fluoboric acid solution or an additional quantity of a solution containing 62% by weight of fluoboric acid.

2. A process as defined in claim 1 in which the concentrated aqueous solution of fluoboric acid has an initial concentration of approximately 62% by weight of fluoboric acid.

3. A process as defined in claim 1 in which the concentrated solution of fluoboric acid containing the dissolved boron compound is maintained at a temperature below 50°C while the gas containing hydrogen fluoride is passed therethrough 4. A process as defined in claim 1 in which the gas that is passed through the concentrated solution of fluoboric acid is a gas from a process for the production of a fluorochloroalkane which contains hydrogen chloride together with the fluorochloroalkane and a small amount hydrogen fluoride.

5. A process as defined in claim 4 in which the concentrated solution of fluoboric acid that is produced in the said process and contains small amounts of dissolved hydrogen chloride is further treated by passing an inert gas therethrough, whereby the hydrogen chloride content of the fluoboric acid solution is reduced substantially.

6. Process as defined in claim 1 conducted in a continuous manner, comprising the addition of boric acid to a solution containing 62 % by weight of fluoboric acid in a dissolving tank, introducing the said solution into an absorption column where it is countercurrently brought into contact with a hydrogen fluoride containing gas, regulating the rate of the hydrogen fluoride containing gas in such way that by reaction of hydrogen fluoride contained therein with the dissolved boric acid a stoichiometric amount of new fluoboric acid in a 62 % concentration by weight is formed, then withdrawing said amount of fluoboric acid produced from the bottom of the absorption column into a storage tank and returning the main quantity of fluoboric acid into the dissolving tank to dissolve further amounts of fluoboric acid therein.

7. A process as defined in claim 1 in which the gas containing hydrogen fluoride and hydrogen chloride also contains one or more gases that are substantially insoluble in or inert with respect to the participating boron compounds.

8. A process as defined in claim 1 that is conducted in a continuous manner which comprises the following steps:
   a. continuously circulating through an absorption column from its head to its bottom an aqueous 62% by weight fluoboric acid solution containing dissolved boric acid,
   b. continuously injecting a gas containing hydrogen fluoride and hydrogen chloride into the said absorption column in a direction countercurrent to that of the solution flowing therethrough, at such a rate that the hydrogen fluoride in the gas reacts with the dissolved boric acid to produce an additional quantity of aqueous 62% by weight fluoboric acid,
   c. continuously withdrawing at the bottom of the said absorption column from the solution passing therethrough an amount of fluoboric acid that is stoichiometrically equivalent to the additional quantity of 62% aqueous fluoboric acid that is formed therein by the reaction of the hydrogen fluoride with the boric acid,
   d. adding boric acid to the remaining portion of the aqueous 62% fluoboric acid solution, and
   e. recirculating the said aqueous 62% fluoboric acid solution containing dissolved boric acid through said absorption column.

* * * * *